(12) United States Patent
Chen et al.

(10) Patent No.: US 12,105,257 B2
(45) Date of Patent: Oct. 1, 2024

(54) CAMERA OPTICAL LENS

(71) Applicant: AAC Optics (Changzhou) Co., Ltd., Changzhou (CN)

(72) Inventors: Jia Chen, Shenzhen (CN); Wen Sun, Shenzhen (CN)

(73) Assignee: AAC Optics (Changzhou) Co., Ltd., Changzhou (CN)

( * ) Notice: Subject to any disclaimer, the term of this patent is extended or adjusted under 35 U.S.C. 154(b) by 805 days.

(21) Appl. No.: 17/134,199

(22) Filed: Dec. 25, 2020

(65) Prior Publication Data

US 2022/0026680 A1 Jan. 27, 2022

(30) Foreign Application Priority Data

Jul. 27, 2020 (CN) .......................... 202010727681.7

(51) Int. Cl.
*G02B 13/00* (2006.01)
*G02B 13/04* (2006.01)
*G02B 13/06* (2006.01)

(52) U.S. Cl.
CPC ......... *G02B 13/0045* (2013.01); *G02B 13/04* (2013.01); *G02B 13/06* (2013.01)

(58) Field of Classification Search
CPC .... G02B 13/0045; G02B 13/04; G02B 13/06; G02B 9/64; G02B 13/18; G02B 27/0025; G02B 15/146; G02B 3/02; H04N 5/222; H04N 23/55
USPC ....... 359/714, 762, 754, 755, 756, 757, 761, 359/749, 708, 658, 657, 656, 681
See application file for complete search history.

(56) References Cited

U.S. PATENT DOCUMENTS

| | | | | |
|---|---|---|---|---|
| 4,163,603 A | * | 8/1979 | Tsunashima | G02B 13/04 359/749 |
| 4,981,344 A | * | 1/1991 | Ueda | G02B 13/24 359/740 |
| 8,801,197 B2 | * | 8/2014 | Morikuni | G03B 21/142 359/716 |
| 2016/0377844 A1 | * | 12/2016 | Cheng | G02B 13/143 359/355 |
| 2018/0372998 A1 | | 12/2018 | Pao et al. | |

(Continued)

FOREIGN PATENT DOCUMENTS

| | | |
|---|---|---|
| CN | 110007444 A1 | 7/2019 |
| CN | 110824664 A1 | 2/2020 |
| CN | 110873944 A1 | 3/2020 |

(Continued)

*Primary Examiner* — Stephone B Allen
*Assistant Examiner* — Daniel Jeffery Jordan
(74) *Attorney, Agent, or Firm* — W&G Law Group (57) ABSTRACT

A camera optical lens includes first to eighth lenses that are arranged sequentially from an object side to an image side. At least one of the first lens to the eighth lens has a free-form surface, and the camera optical lens satisfies: $1.30 \le f4/f \le 5.00$; and $0 \le (R9+R10)/(R9-R10) \le 4.50$, where f denotes a focal length of the camera optical lens, f4 denotes a focal length of the fourth lens, R9 denotes a curvature radius of an object-side surface of the fifth lens, and R10 denotes a curvature radius of an image-side surface of the fifth lens. The camera optical lens has a wide angle and is ultra-thin, as well as having excellent optical performance, and can effectively correct aberration and improve the performance of the optical system.

9 Claims, 6 Drawing Sheets

(56) References Cited

U.S. PATENT DOCUMENTS

2020/0073092 A1* 3/2020 Chen .................. G02B 13/18
2020/0081226 A1* 3/2020 Lee .................. G02B 13/005

FOREIGN PATENT DOCUMENTS

| | | | |
|---|---|---|---|
| CN | 211123463 U | | 7/2020 |
| CN | 111596446 A1 | | 8/2020 |
| JP | 1997080303 A | | 3/1997 |
| JP | 1997096759 A | | 4/1997 |
| JP | 2006030581 A | * | 2/2006 |
| WO | 2019117067 A1 | | 6/2019 |
| WO | 2021065092 A1 | | 4/2021 |

* cited by examiner

CAMERA OPTICAL LENS

TECHNICAL FIELD

The present disclosure relates to the field of optical lenses, and more particularly, to a camera optical lens suitable for handheld terminal devices such as smart phones and digital cameras, and suitable for camera devices such as monitors and PC lenses.

BACKGROUND

With development of camera lenses, higher and higher requirements are put forward for imaging of the lens. The "night scene photography" and "background blur" of the lens have also become important indicators to measure an imaging of the lens. The structures have insufficient refractive power distribution, lens spacing and lens shape settings, resulting in insufficient ultra-thinness and wide angle. Moreover, the rotationally symmetric aspherical surface cannot correct aberrations well. A free-form surface is a non-rotationally symmetric surface, which can better balance aberrations and improve the imaging quality. Besides, processing of the free-form surface has been gradually mature. With the increasing requirements for imaging of the lens, it is very important to provide a free-curve surface in the design of a lens, and a good effect can be achieved in the design of a wide-angle and ultra-wide-angle lens.

SUMMARY

In view of the above-mentioned problems, a purpose of the present disclosure is to provide a camera optical lens, which has a wide angle and ultra-thinness, as well as excellent optical performance, and can effectively correct aberration and further improve the performance of the optical system.

An embodiment of the present disclosure provides a camera optical lens, and the camera optical lens includes a first lens, a second lens, a third lens, a fourth lens, a fifth lens, a sixth lens, a seventh lens, and an eighth lens that are sequentially arranged from an object side to an image side. At least one of the first lens, the second lens, the third lens, the fourth lens, the fifth lens, the sixth lens, the seventh lens, or the eighth lens has a free-form surface. The camera optical lens satisfies: $1.30 \leq f4/f \leq 5.00$; and $0 \leq (R9+R10)/(R9-R10) \leq 4.50$, where f denotes a focal length of the camera optical lens, f4 denotes a focal length of the fourth lens, R9 denotes a curvature radius of an object-side surface of the fifth lens, and R10 denotes a curvature radius of an image-side surface of the fifth lens.

As an improvement, the camera optical lens satisfies: $4.00 \leq d7/d6 \leq 12.00$, where d6 denotes an on-axis distance from an image-side surface of the third lens to an object-side surface of the fourth lens, and d7 denotes an on-axis thickness of the fourth lens.

As an improvement, the camera optical lens satisfies:

$-4.09 \leq f1/f \leq -1.09$;

$-1.03 \leq (R1+R2)/(R1-R2) \leq 1.02$; and $0.03 \leq d1/TTL \leq 0.14$, where f1 denotes a focal length of the first lens, R1 denotes a curvature radius of an object-side surface of the first lens, R2 denotes a curvature radius of an image-side surface of the first lens, d1 denotes an on-axis thickness of the first lens, and TTL denotes a total optical length from an object-side surface of the first lens to an image plane of the camera optical lens along an optic axis.

As an improvement, the camera optical lens satisfies:

$-27.08 \leq f2/f \leq 9.25$;

$-14.25 \leq (R3+R4)/(R3-R4) \leq 17.55$; and $0.02 \leq d3/TTL \leq 0.08$, where f2 denotes a focal length of the second lens, R3 denotes a curvature radius of an object-side surface of the second lens, R4 denotes a curvature radius of an image-side surface of the second lens, d3 denotes an on-axis thickness of the second lens, and TTL denotes a total optical length from an object-side surface of the first lens to an image plane of the camera optical lens along an optic axis.

As an improvement, the camera optical lens satisfies:

$0.54 \leq f3/f \leq 8.03$;

$-5.25 \leq (R5+R6)/(R5-R6) \leq -0.10$; and $0.02 \leq d5/TTL \leq 0.12$, where f3 denotes a focal length of the third lens, R5 denotes a curvature radius of an object-side surface of the third lens, R6 denotes a curvature radius of an image-side surface of the third lens, d5 denotes an on-axis thickness of the third lens, and TTL denotes a total optical length from an object-side surface of the first lens to an image plane of the camera optical lens along an optic axis.

As an improvement, the camera optical lens satisfies:

$0.20 \leq (R7+R8)/(R7-R8) \leq 6.80$; and $0.03 \leq d7/TTL \leq 0.14$, where R7 denotes a curvature radius of an object-side surface of the fourth lens, R8 denotes a curvature radius of an image-side surface of the fourth lens, d7 denotes an on-axis thickness of the fourth lens, and TTL denotes a total optical length from an object-side surface of the first lens to an image plane of the camera optical lens along an optic axis.

As an improvement, the camera optical lens satisfies:

$-8.06 \leq f5/f \leq -1.87$; and $0.02 \leq d9/TTL \leq 0.06$, where f5 denotes a focal length of the fifth lens, d9 denotes an on-axis thickness of the fifth lens, and TTL denotes a total optical length from an object-side surface of the first lens to an image plane of the camera optical lens along an optic axis.

As an improvement, the camera optical lens satisfies:

$-5.57 \leq f6/f \leq 2.97$;

$-0.54 \leq (R11+R12)/(R11-R12) \leq 0.60$; and $0.05 \leq d11/TTL \leq 0.16$, where f6 denotes a focal length of the sixth lens, R11 denotes a curvature radius of an object-side surface of the sixth lens, R12 denotes a curvature radius of an image-side surface of the sixth lens, d11 denotes an on-axis thickness of the sixth lens, and TTL denotes a total optical length from an object-side surface of the first lens to an image plane of the camera optical lens along an optic axis.

As an improvement, the camera optical lens satisfies:

$0.41 \leq f7/f \leq 1.99$;

$0.26 \leq (R13+R14)/(R13-R14) \leq 5.59$; and $0.04 \leq d13/TTL \leq 0.20$, where f7 denotes a focal length of the seventh lens, R13 denotes a curvature radius of an object-side surface of the seventh lens, R14 denotes a curvature radius of an image-side surface of the seventh lens, d13 denotes an on-axis thickness of the seventh lens, and TTL denotes a total optical length from an object-side surface of the first lens to an image plane of the camera optical lens along an optic axis.

As an improvement, the camera optical lens satisfies:

$2.75 \leq f8/f \leq -0.81$;

$1.14 \leq (R15+R16)/(R15-R16) \leq 4.00$; and $0.04 \leq d15/TTL \leq 0.16$, where f8 denotes a focal length of the eighth lens, R15 denotes a curvature radius of an object-side surface of the eighth lens, R16 denotes a curvature radius of an image-side surface of the eighth lens, d15 denotes an on-axis thickness of the eighth lens, and TTL denotes a total optical length from an object-side surface of the first lens to an image plane of the camera optical lens along an optic axis.

The camera optical lens of the present disclosure has a wide angle and ultra-thinness, as well as excellent optical performance. Meanwhile, at least one lens of the first lens, the second lens, the third lens, the fourth lens, the fifth lens, the sixth lens, the seventh lens, or the eighth lens has a free-form surface, which can effectively correct aberration and improve the performance of the optical system, and is suitable for mobile phone camera lens assembly and WEB camera lens that are formed by imaging elements for high pixel such as CCD and CMOS.

DESCRIPTION OF EMBODIMENTS

In order to better illustrate the purpose, technical solutions and advantages of the present disclosure, the embodiments of the present disclosure will be described in details as follows with reference to the accompanying drawings. However, it should be understood by those skilled in the art that, technical details are set forth in the embodiments of the present disclosure so as to better illustrate the present disclosure. However, the technical solutions claimed in the present disclosure can be achieved without these technical details and various changes and modifications based on the following embodiments.

Embodiment 1

Figure 1:
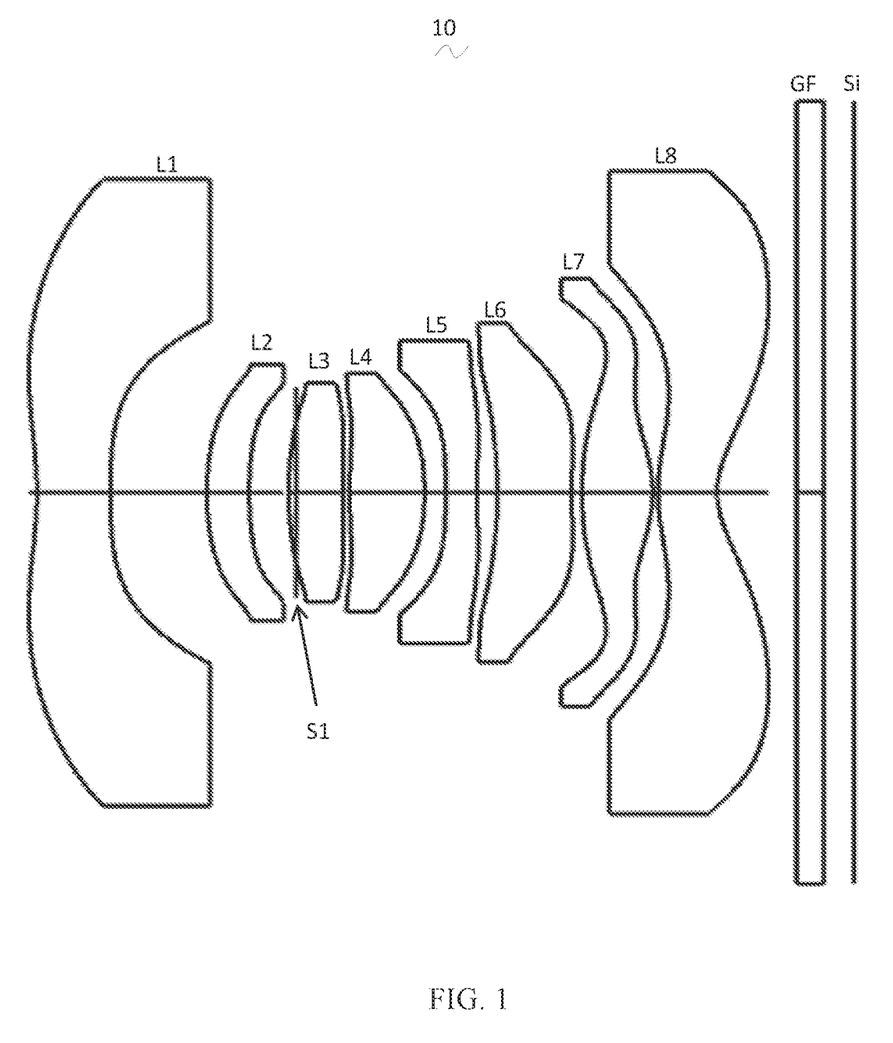
FIG. 1 is a schematic structural diagram of a camera optical lens according to Embodiment 1 of the present disclosure.

With reference to FIG. 1, the present disclosure provides a camera optical lens 10. FIG. 1 illustrates a camera optical lens 10 according to Embodiment 1 of the present disclosure. The camera optical lens 10 includes eight lenses. Specifically, the camera optical lens 10 includes a first lens L1, a second lens L2, an aperture S1, a third lens L3, a fourth lens L4, a fifth lens L5, a sixth lens L6, a seventh lens L7, and an eighth lens L8 that are sequentially arranged from an object side to an image side. Optical elements such as an optical filter GF can be provided between the eighth lens L8 and an image plane Si.

As an example, the first lens L1 is made of a plastic material, the second lens L2 is made of a plastic material, the third lens L3 is made of a plastic material, the fourth lens L4 is made of a plastic material, the fifth lens L5 is made of a plastic material, the sixth lens L6 is made of a plastic material, the seventh lens L7 is made of a plastic material, and the eighth lens L8 is made of a plastic material. In other embodiments, each lens can also be made of another material.

In this embodiment, at least one of the first lens L1, the second lens L2, the third lens L3, the fourth lens L4, the fifth lens L5, the sixth lens L6, the seventh lens L7, or the eighth lens L8 includes a free-form surface, and the free-form surface contributes to correction of aberrations such as astigmatism, field curvature, and distortion of a wide-angle optical system, thereby improving the imaging quality.

The camera optical lens satisfies the following condition: $1.30 \leq f4/f \leq 5.00$, where f denotes a focal length of the camera optical lens and f4 denotes a focal length of the fourth lens. The condition specifies a ratio of the focal length of the fourth lens to the focal length of the camera optical lens 10. With this condition, the imaging quality is improved.

The camera optical lens satisfies the following condition: $0 \leq (R9+R10)/(R9-R10) \leq 4.50$, where R9 denotes a curvature radius of an object-side surface of the fifth lens, and R10 denotes a curvature radius of an image-side surface of the fifth lens. This condition specifies a shape of the fifth lens L5. With this condition, a degree of light deflection is reduced and the image quality is improved.

As an example, the camera optical lens satisfies the following condition: $4.00 \leq d7/d6 \leq 12.00$, where d6 denotes an on-axis distance from an image-side surface of the third lens to an object-side surface of the fourth lens, and d7 is an on-axis thickness of the fourth lens. With the condition, the total length of the optical system is reduced, which achieves ultra-thinness.

In this embodiment, the first lens L1 has negative refractive power, the object-side surface of the first lens L1 is a recessed surface at a paraxial position, and the image-side surface of the first lens L1 is a recessed surface at a paraxial position. In other optional embodiments, the first lens L1 may have positive refractive power.

As an example, the camera optical lens satisfies the following condition: $-4.09 \leq f1/f \leq -1.09$, where f denotes the focal length of the camera optical lens and f1 denotes a focal length of the first lens. This condition specifies a ratio of the focal length of the first lens L1 to the focal length of the camera optical lens. With the condition, the first lens has an appropriate negative refractive power, which reduces aberration of the system and achieves ultra-thin and wide-angle camera optical lens. As an example, the camera optical lens satisfies the following condition: $-2.56 \leq f1/f \leq -1.36$.

As an example, the camera optical lens satisfies the following condition: $-1.03 \leq (R1+R2)/(R1-R2) \leq 1.02$. By reasonably controlling a shape of the first lens, the first lens can effectively correct spherical aberration of the system. As an example, the camera optical lens satisfies the following condition: $-0.65 \leq (R1+R2)/(R1-R2) \leq 0.82$.

As an example, the camera optical lens satisfies the following condition: $0.03 \leq d1/TTL \leq 0.14$, where d1 denotes an on-axis thickness of the first lens, and TTL denotes a total optical length from an object-side surface of the first lens to an image plane of the camera optical lens along an optic axis. With the condition, it is beneficial to achieving ultra-thinness. As an example, the camera optical lens satisfies the following condition: $0.05 \leq d1/TTL \leq 0.11$.

In this embodiment, the second lens L2 has a positive refractive power and includes an object-side surface being convex in a paraxial region and an image-side surface being concave in the paraxial region. In other embodiments, the second lens L2 can have a negative refractive power.

As an example, the camera optical lens satisfies the following condition: $-27.08 \leq f2/f \leq 9.25$, where f denotes the focal length of the camera optical lens 10 and f2 denotes a focal length of the second lens. This condition specifies a ratio of the focal length of the second lens L2 to the focal length f. By controlling the refractive power of the second lens L2 within a reasonable range, it is beneficial to correcting aberration of the optical system. As an example, the camera optical lens satisfies the following condition: $-16.93 \leq f2/f \leq 7.40$.

As an example, the camera optical lens satisfies the following condition: $-14.25 \leq (R3+R4)/(R3-R4) \leq 17.55$, where R3 denotes a curvature radius of an object-side surface of the second lens L2, and R4 denotes a curvature radius of an image-side surface of the second lens L2. This condition specifies a shape of the second lens L2. With the condition and the development of ultra-thin and wide-angle lens, longitudinal aberration can be corrected. As an example, the camera optical lens satisfies the following condition: $-8.91 \leq (R3+R4)/(R3-R4) \leq 14.04$.

As an example, the camera optical lens satisfies the following condition: $0.02 \leq d3/TTL \leq 0.08$, where d3 denotes an on-axis thickness of the second lens, and TTL denotes a total optical length from an object-side surface of the first lens to an image plane of the camera optical lens along an optic axis. With the condition, it is beneficial to achieving ultra-thinness. As an example, the camera optical lens satisfies the following condition: $0.03 \leq d3/TTL \leq 0.06$.

In this embodiment, the third lens L3 has a positive refractive power and includes an object-side surface being convex in a paraxial region and an image-side surface being concave in the paraxial region. In other embodiments, the third lens L3 can have a negative refractive power.

As an example, the camera optical lens satisfies the following condition: $0.54 \leq f3/f \leq 8.03$, where f denotes the focal length of the camera optical lens 10, and f3 denotes a focal length of the third lens. This condition specifies a ratio of the focal length of the third lens L3 to the focal length f Reasonable distribution of focal power enables the system to have better imaging quality and lower sensitivity. As an example, the camera optical lens satisfies the following condition: $0.86 \leq f3/f \leq 6.42$.

As an example, the camera optical lens satisfies the following condition: $-5.25 \leq (R5+R6)/(R5-R6) \leq -0.10$, where R5 denotes a curvature radius of an object-side surface of the third lens, and R6 denotes a curvature radius of an image-side surface of the third lens. This condition specifies a shape of the third lens L3. With the condition, it is beneficial to alleviating a degree of deflection of light passing through the lens and effectively reducing aberration. As an example, the camera optical lens satisfies the following condition: $-3.28 \leq (R5+R6)/(R5-R6) \leq -0.12$.

As an example, the camera optical lens satisfies the following condition: $0.02 \leq d5/TTL \leq 0.12$, where d5 denotes an on-axis thickness of the third lens, and TTL denotes a total optical length from an object-side surface of the first lens to an image plane of the camera optical lens along an optic axis. With the condition, it is beneficial to achieving ultra-thinness. As an example, the camera optical lens satisfies the following condition: $0.04 \leq d5/TTL \leq 0.09$.

In this embodiment, the fourth lens L4 has a positive refractive power and includes an object-side surface being convex in a paraxial region and an image-side surface being convex in the paraxial region. In other embodiments, the fourth lens L4 can have a negative refractive power.

As an example, the camera optical lens satisfies the following condition: $0.20 \leq (R7+R8)/(R7-R8) \leq 6.80$, where R7 denotes a curvature radius of an object-side surface of the fourth lens, and R8 denotes a curvature radius of an image-side surface of the fourth lens. This condition specifies a shape of the fourth lens L4. With the condition and development of ultra-thin and wide-angle lenses, aberration of an off-axis angle can be corrected. As an example, the camera optical lens satisfies the following condition: $0.32 \leq (R7+R8)/(R7-R8) \leq 5.44$.

As an example, the camera optical lens satisfies the following condition: $0.03 \leq d7/TTL \leq 0.14$, where d7 denotes an on-axis thickness of the fourth lens, and TTL denotes a total optical length from an object-side surface of the first lens to an image plane of the camera optical lens along an optic axis. With the condition, it is beneficial to achieving ultra-thinness. As an example, the camera optical lens satisfies the following condition: $0.05 \leq d7/TTL \leq 0.11$.

In this embodiment, the fifth lens L5 has a negative refractive power and includes an object-side surface being concave in a paraxial region and an image-side surface being concave in the paraxial region. In other embodiments, the fifth lens L5 can have a positive reactive power.

As an example, the camera optical lens satisfies the following condition: $-8.06 \leq f5/f \leq -1.87$, where f denotes a focal length of the camera optical lens, and f5 denotes a focal length of the fifth lens. This condition specifies a ratio of the focal length of the fifth lens L5 to the focal length f. The limitation on the fifth lens L5 can effectively smooth a light angle of the camera lens and reduce tolerance sensitivity. As an example, the camera optical lens satisfies the following condition: $-5.04 \leq f5/f \leq -2.34$.

As an example, the camera optical lens satisfies the following condition: $0.02 \leq d9/TTL \leq 0.06$, where d9 denotes an on-axis thickness of the fifth lens, and TTL denotes a total optical length from an object-side surface of the first lens to an image plane of the camera optical lens along an optic axis. With the condition, it is beneficial to achieving ultra-thinness. As an example, the camera optical lens satisfies the following condition: $0.03 \leq d9/TTL \leq 0.05$.

In this embodiment, the sixth lens L6 has a negative refractive power and includes an object-side surface being concave in a paraxial region and an image-side surface being concave in the paraxial region. In other embodiments, the sixth lens L6 can have a positive reactive power.

As an example, the camera optical lens satisfies the following condition: −5.57≤f6/f≤2.97, where f denotes a focal length of the camera optical lens, and f6 denotes a focal length of the sixth lens. This condition specifies a ratio of the focal length of the sixth lens L6 to the focal length f. Reasonable distribution of focal power enables the system to have better imaging quality and lower sensitivity. As an example, the camera optical lens satisfies the following condition: −3.48≤f6/f≤2.38.

As an example, the camera optical lens satisfies the following condition: −0.54≤(R11+R12)/(R11−R12)≤0.60, where R11 denotes a curvature radius of an object-side surface of the sixth lens, and R12 denotes a curvature radius of an image-side surface of the sixth lens. This condition specifies a shape of the sixth lens L6. With the condition and the development of ultra-thin and wide-angle lenses, it is beneficial to correcting aberration of an off-axis angle. As an example, the camera optical lens satisfies the following condition: −0.34≤(R11+R12)/(R11−R12)≤0.48.

As an example, the camera optical lens satisfies the following condition: 0.05≤d11/TTL≤0.16, where d11 denotes an on-axis thickness of the sixth lens, and TTL denotes a total optical length from an object-side surface of the first lens to an image plane of the camera optical lens along an optic axis. With the condition, it is beneficial to achieving ultra-thinness. As an example, the camera optical lens satisfies the following condition: 0.07≤d11/TTL≤0.13.

In this embodiment, the seventh lens L7 has a positive refractive power and includes an object-side surface being convex in a paraxial region and an image-side surface being convex in the paraxial region. In other embodiments, the seventh lens L7 has a negative refractive power.

As an example, the camera optical lens satisfies the following condition: 0.41≤f7/f≤1.99, where f denotes a focal length of the camera optical lens and f7 denotes a focal length of the seventh lens. This condition specifies a ratio of the focal length of the seventh lens L7 to the focal length f. Reasonable distribution of focal power enables the system to have better imaging quality and lower sensitivity. As an example, the camera optical lens satisfies the following condition: 0.66≤f7/f≤1.59.

As an example, the camera optical lens satisfies the following condition: 0.26≤(R13+R14)/(R13−R14)≤5.59, where R13 denotes a curvature radius of an object-side surface of the seventh lens, and R14 denotes a curvature radius of an image-side surface of the seventh lens. This condition specifies a shape of the seventh lens L7. With the condition and the development of ultra-thinness and wide-angle lenses, aberration of an off-axis angle can be corrected. As an example, the camera optical lens satisfies the following condition: 0.41≤(R13+R14)/(R13−R14)≤4.47.

As an example, the camera optical lens satisfies the following condition: 0.04≤d13/TTL≤0.20, where d13 denotes an on-axis thickness of the seventh lens, and TTL denotes a total optical length from an object-side surface of the first lens to an image plane of the camera optical lens along an optic axis. With the condition, it is beneficial to achieving ultra-thinness. As an example, the camera optical lens satisfies the following condition: 0.07≤d13/TTL≤0.16.

In this embodiment, the eighth lens L8 has a negative refractive power and includes an object-side surface being convex in a paraxial region and an image-side surface being concave in the paraxial region. In other embodiments, the eighth lens L8 has a positive refractive power.

As an example, the camera optical lens satisfies the following condition: −2.75≤f8/f≤−0.81, where f denotes a focal length of the camera optical lens, and f8 denotes a focal length of the eighth lens. This condition specifies a ratio of the focal length of the eighth lens L8 to the focal length f. Reasonable distribution of focal power enables the system to have better imaging quality and lower sensitivity. As an example, the camera optical lens satisfies the following condition: −1.72≤f8/f≤−1.01.

As an example, the camera optical lens satisfies the following condition: 1.14≤(R15+R16)/(R15−R16)≤4.00, where R15 denotes a curvature radius of an object-side surface of the eighth lens, and R16 denotes a curvature radius of an image-side surface of the eighth lens. This condition specifies a shape of the eighth lens L8. With this condition and development of ultra-thinness and wide-angle lenses, aberration of an off-axis angle can be corrected. As an example, the camera optical lens satisfies the following condition: 1.82≤(R15+R16)/(R15−R16)≤3.20.

As an example, the camera optical lens satisfies the following condition: 0.04≤d15/TTL≤0.16, where d15 denotes an on-axis thickness of the eighth lens, and TTL denotes a total optical length from an object-side surface of the first lens to an image plane of the camera optical lens along an optic axis. With this condition, it is beneficial to achieving ultra-thinness. As an example, the camera optical lens satisfies the following condition: 0.06≤d15/TTL≤0.13.

As an example, the optical length TTL of the camera optical lens 10 is smaller than or equal to 6.82 mm, which is beneficial to achieving ultra-thinness. As an example, the optical length TTL is smaller than or equal to 6.51 mm.

As an example, an aperture value FNO of the camera optical lens 10 is smaller than or equal to 2.00, which can achieve a large aperture and good imaging performance.

As an example, a ratio of the optical length TTL of the camera optical lens to the full FOV image height IH (in a diagonal direction) is TTL/IH≤2.07, which is beneficial to achieving ultra-thinness. The FOV in the diagonal direction is larger than or equal to 120°, which is beneficial to achieving a wide angle.

When the above-mentioned condition is satisfied, the camera optical lens 10 has good optical performance, and when the free-form surface is adopted, the designed image plane area can be matched with an actual use area, thereby improving the image quality of the effective area to the greatest extent; and according to the characteristics of the camera optical lens 10, the camera optical lens 10 is suitable for a mobile phone camera lens assembly and a WEB camera lens that are formed by imaging elements for high pixels such as CCD and CMOS.

The camera optical lens 10 of the present disclosure will be described in the following by examples. The reference signs described in each example are as follows. The units of the focal length, the on-axis distance, the curvature radius, and the on-axis thickness are mm.

TTL: the optical length (an on-axis distance from the object-side surface of the first lens L1 to the image plane), in a unit of mm.

FNO: a ratio of an effective focal length of the camera optical lens to an entrance pupil diameter.

Table 1 and Table 2 show design data of the camera optical lens 10 according to the Embodiment 1 of the present disclosure. Herein, the object-side surface and image-side surface of the first lens L1 are free-form surfaces.

TABLE 1

| | R | d | nd | | vd | |
|---|---|---|---|---|---|---|
| S1 | ∞ | d0= | −1.962 | | | |
| R1 | −2.706 | d1= | 0.557 | nd1 | 1.5444 | v1 | 56.43 |
| R2 | 8.028 | d2= | 0.731 | | | |
| R3 | 2.307 | d3= | 0.322 | nd2 | 1.6610 | v2 | 20.53 |
| R4 | 3.428 | d4= | 0.299 | | | |
| R5 | 3.017 | d5= | 0.412 | nd3 | 1.5444 | v3 | 56.43 |
| R6 | 6.735 | d6= | 0.050 | | | |
| R7 | 4.312 | d7= | 0.569 | nd4 | 1.5444 | v4 | 56.43 |
| R8 | −1.850 | d8= | 0.160 | | | |
| R9 | −8.639 | d9= | 0.240 | nd5 | 1.6800 | v5 | 18.40 |
| R10 | 7.764 | d10= | 0.152 | | | |
| R11 | −4.388 | d11= | 0.565 | nd6 | 1.5444 | v6 | 56.43 |
| R12 | 7.609 | d12= | 0.078 | | | |
| R13 | 3.190 | d13= | 0.537 | nd7 | 1.5444 | v7 | 56.43 |
| R14 | −1.023 | d14= | 0.040 | | | |
| R15 | 1.630 | d15= | 0.449 | nd8 | 1.6032 | v8 | 28.29 |
| R16 | 0.656 | d16= | 0.600 | | | |
| R17 | ∞ | d17= | 0.210 | ndg | 1.5168 | vg | 64.17 |
| R18 | ∞ | d18= | 0.230 | | | |

The representation of each reference sign is as follows.

S1: aperture;

R: curvature radius at a center of an optical surface;

R1: curvature radius of an object-side surface of a first lens L1;

R2: curvature radius of an image-side surface of the first lens L1;

R3: curvature radius of an object-side surface of a second lens L2;

R4: curvature radius of an image-side surface of the second lens L2;

R5: curvature radius of an object-side surface of a third lens L3;

R6: curvature radius of an image-side surface of the third lens L3;

R7: curvature radius of an object-side surface of a fourth lens L4;

R8: curvature radius of an image-side surface of the fourth lens L4;

R9: curvature radius of an object-side surface of a fifth lens L5;

R10: curvature radius of an image-side surface of the fifth lens L5;

R11: curvature radius of an object-side surface of a sixth lens L6;

R12: curvature radius of an image-side surface of the sixth lens L6;

R13: curvature radius of an object-side surface of a seventh lens L7;

R14: curvature radius of an image-side surface of the seventh lens L7;

R15: curvature radius of an object-side surface of an eighth lens L8;

R16: curvature radius of an image-side surface of the eighth lens L8;

R17: curvature radius of an object-side surface of an optical filter GF;

R18: curvature radius of an image-side surface of the optical filter GF;

d: on-axis thickness of the lens, and on-axis distance between lenses;

d0: on-axis distance from the aperture S1 to the object-side surface of the first lens L1;

d1: on-axis thickness of the first lens L1;

d2: on-axis distance from the image-side surface of the first lens L1 to the object-side surface of the second lens L2;

d3: on-axis thickness of the second lens L2;

d4: on-axis distance from the image-side surface of the second lens L2 to the object-side surface of the third lens L3;

d5: on-axis thickness of the third lens L3;

d6: on-axis distance from the image-side surface of the third lens L3 to the object-side surface of the fourth lens L4;

d7: on-axis thickness of the fourth lens L4;

d8: on-axis distance from the image-side surface of the fourth lens L4 to the object-side surface of the fifth lens L5;

d9: on-axis thickness of the fifth lens L5;

d10: on-axis distance from the image-side surface of the fifth lens L5 to the object-side surface of the sixth lens L6;

d11: on-axis thickness of the sixth lens L6;

d12: on-axis distance from the image-side surface of the sixth lens L6 to the object-side surface of the seventh lens L7;

d13: on-axis thickness of the seventh lens L7;

d14: on-axis distance from the image-side surface of the seventh lens L7 to the object-side surface of the eighth lens L8;

d15: on-axis thickness of the eighth lens L8;

d16: on-axis distance from the image-side surface of the eighth lens L8 to the object-side surface of the optical filter GF;

d17: on-axis thickness of an optical filter GF;

d18: on-axis distance from the image-side surface of the optical filter GF to the image plane;

nd: refractive index of d-line;

nd1: refractive index of d-line of the first lens L1;

nd2: refractive index of d-line of the second lens L2;

nd3: refractive index of d-line of the third lens L3;

nd4: refractive index of d-line of the fourth lens L4;

nd5: refractive index of d-line of the fifth lens L5;

nd6: refractive index of d-line of the sixth lens L6;

nd7: refractive index of d-line of the seventh lens L7;

nd8: refractive index of d-line of the eighth lens L8;

ndg: refractive index of d-line of the optical filter GF;

vd: abbe number;

v1: abbe number of the first lens L1;

v2: abbe number of the second lens L2;

v3: abbe number of the third lens L3;

v4: abbe number of the fourth lens L4;

v5: abbe number of the fifth lens L5;

v6: abbe number of the sixth lens L6;

v7: abbe number of the seventh lens L7;

v8: abbe number of the eighth lens L8;

vg: abbe number of the optical filter GF.

Table 2 shows aspherical data of each lens in the camera optical lens 10 according to the Embodiment 1 of the present disclosure.

TABLE 2

| | Conic coefficient | Aspherical coefficient | | | | |
|---|---|---|---|---|---|---|
| | k | A4 | A6 | A8 | A10 | A12 |
| R3 | −5.4686E−01 | 7.0376E−02 | 2.1279E−01 | −1.0676E+00 | 3.9962E+00 | −8.4982E+00 |
| R4 | 8.0542E+00 | 1.3177E−01 | −4.8657E−02 | 1.0519E+00 | −3.0411E+00 | 5.1511E+00 |
| R5 | −2.5438E+00 | 2.7879E−02 | 7.7464E−02 | −1.9702E−01 | 4.7072E−01 | −4.6774E−01 |
| R6 | 1.0000E+01 | −2.4001E−01 | −9.0940E−02 | 1.7898E−01 | −1.3558E−01 | 1.1205E+00 |
| R7 | −9.8626E+00 | −1.7997E−01 | −1.4558E−01 | −1.5623E−01 | 8.0853E−01 | −4.8162E−01 |
| R8 | 1.0388E+00 | −1.0732E−01 | −1.2083E−01 | 4.6083E−01 | −1.6701E+00 | 3.8440E+00 |
| R9 | −1.0000E+01 | −3.6273E−01 | −7.0182E−02 | 1.1759E−01 | −1.3716E+00 | 6.4462E+00 |
| R10 | 1.0000E+01 | −1.8584E−01 | 8.4551E−02 | −1.4315E−01 | 9.5290E−03 | 5.9699E−01 |
| R11 | −4.2350E+00 | −7.3499E−02 | 1.2545E−01 | 3.0401E−01 | −1.6465E+00 | 2.7104E+00 |
| R12 | 3.4895E+00 | −1.4095E−01 | −6.7513E−01 | 1.1114E+00 | −8.3230E−01 | 3.2713E−01 |
| R13 | 2.1941E+00 | 2.4068E−01 | −6.6271E−01 | 8.9981E−01 | −6.4658E−01 | 6.5149E−02 |
| R14 | −6.8955E−01 | 6.5453E−01 | −5.8079E−01 | 1.0979E+00 | −1.6190E+00 | 1.3488E+00 |
| R15 | −1.3490E+00 | −3.2312E−01 | −3.5983E−02 | 3.3460E−01 | −3.3186E−01 | 1.6038E−01 |
| R16 | −3.4488E+00 | −2.0970E−01 | 1.6431E−01 | −9.1768E−02 | 3.4856E−02 | −8.8073E−03 |

| | Conic coefficient | Aspherical coefficient | | | |
|---|---|---|---|---|---|
| | k | A14 | A16 | A18 | A20 |
| R3 | −5.4686E−01 | 1.0459E+01 | −6.8893E+00 | 1.8218E+00 | 0.0000E+00 |
| R4 | 8.0542E+00 | −3.4654E+00 | 0.0000E+00 | 0.0000E+00 | 0.0000E+00 |
| R5 | −2.5438E+00 | 0.0000E+00 | 0.0000E+00 | 0.0000E+00 | 0.0000E+00 |
| R6 | 1.0000E+01 | −1.2065E+00 | 0.0000E+00 | 0.0000E+00 | 0.0000E+00 |
| R7 | −9.8626E+00 | 2.0262E−01 | −1.9178E−01 | 0.0000E+00 | 0.0000E+00 |
| R8 | 1.0388E+00 | −4.4884E+00 | 2.3002E+00 | −2.4168E−01 | 0.0000E+00 |
| R9 | −1.0000E+01 | −1.0904E+01 | 8.0550E+00 | −2.2197E+00 | 0.0000E+00 |
| R10 | 1.0000E+01 | −8.2430E−01 | 4.3111E−01 | −8.2045E−02 | 0.0000E+00 |
| R11 | −4.2350E+00 | −2.1204E+00 | 8.1430E−01 | −1.2441E−01 | 0.0000E+00 |
| R12 | 3.4895E+00 | −5.8723E−02 | 4.0310E−03 | −1.2299E−03 | 3.7079E−04 |
| R13 | 2.1941E+00 | 2.1842E−01 | −1.5208E−01 | 4.2027E−02 | −4.3358E−03 |
| R14 | −6.8955E−01 | −6.6161E−01 | 1.9182E−01 | −3.0484E−02 | 2.0513E−03 |
| R15 | −1.3490E+00 | −4.1465E−02 | 5.2458E−03 | −1.8741E−04 | −1.1490E−05 |
| R16 | −3.4488E+00 | 1.4429E−03 | −1.4627E−04 | 8.2247E−06 | −1.9362E−07 |

$$z = (cr^2)/\{1 + [1 - (k+1)(c^2 r^2)]^{1/2}\} + A4r^4 + A6r^6 + A8r^8 + A10r^{10} + A12r^{12} + A14r^{14} + A16r^{16} + A18r^{18} + A20r^{20}, \quad (1)$$

where k represents a conic coefficient, A4, A6, A8, A10, A12, A14, A16, A18, and A20 represent aspherical coefficients, c represents the curvature at the center of the optical surface, r represents a vertical distance between a point on an aspherical curve and the optic axis, Z represents an aspherical depth (a vertical distance between a point on an aspherical surface, having a distance of x from the optic axis, and a surface tangent to a vertex of the aspherical surface on the optic axis).

For convenience, the aspherical surface of each lens adopts the aspherical surface shown in the above equation (1). However, the present disclosure is not limited to the aspherical polynomial form shown in the condition (1).

Table 3 shows free-form surface data in the camera optical lens 10 according to the Embodiment 1 of the present disclosure.

TABLE 3

| | Free-form surface coefficient | | | | | | | |
|---|---|---|---|---|---|---|---|---|
| | k | $X^4Y^0$ | $X^2Y^2$ | $X^0Y^4$ | $X^6Y^0$ | $X^4Y^2$ | $X^2Y^4$ | $X^0Y^6$ |
| R1 | −2.5000E+01 | 9.1129E−02 | 1.8234E−01 | 9.1181E−02 | −4.8837E−02 | −1.4654E−01 | −1.4651E−01 | −4.8899E−02 |
| R2 | 9.9981E+00 | 2.6922E−01 | 5.3887E−01 | 2.6963E−01 | −1.8591E−01 | −5.5613E−01 | −5.5899E−01 | −1.8673E−01 |

| | $X^8Y^0$ | $X^6Y^2$ | $X^4Y^4$ | $X^2Y^6$ | $X^0Y^8$ | $X^{10}Y^0$ | $X^8Y^2$ | $X^6Y^4$ |
|---|---|---|---|---|---|---|---|---|
| R1 | 2.2442E−02 | 8.9764E−02 | 1.3466E−01 | 8.9753E−02 | 2.2464E−02 | −7.7308E−03 | −3.8660E−02 | −7.7319E−02 |
| R2 | 1.7160E−01 | 6.8586E−01 | 1.0228E+00 | 6.9090E−01 | 1.7221E−01 | −1.0016E−01 | −5.0957E−01 | −9.9352E−01 |

| | $X^4Y^6$ | $X^2Y^8$ | $X^0Y^{10}$ | $X^{12}Y^0$ | $X^{10}Y^2$ | $X^8Y^4$ | $X^6Y^6$ | $X^4Y^8$ |
|---|---|---|---|---|---|---|---|---|
| R1 | −7.7318E−02 | −3.8643E−02 | −7.7290E−03 | 1.8910E−03 | 1.1348E−02 | 2.8370E−02 | 3.7816E−02 | 2.8378E−02 |
| R2 | −1.0024E+00 | −5.0541E−01 | −1.0075E−01 | 3.7678E−02 | 2.3691E−01 | 5.7021E−01 | 7.5395E−01 | 5.7545E−01 |

TABLE 3-continued

| | $X^2Y^{10}$ | $X^0Y^{12}$ | $X^{14}Y^0$ | $X^{12}Y^2$ | $X^{10}Y^4$ | $X^8Y^6$ | $X^6Y^8$ | $X^4Y^{10}$ |
|---|---|---|---|---|---|---|---|---|
| R1 | 1.1336E−02 | 1.8895E−03 | −3.1554E−04 | −2.2084E−03 | −6.6247E−03 | −1.1042E−02 | −1.1041E−02 | −6.6283E−03 |
| R2 | 2.2575E−01 | 3.8474E−02 | −6.7498E−03 | −5.0852E−02 | −1.4651E−01 | −2.3960E−01 | −2.4161E−01 | −1.4581E−01 |

| | $X^2Y^{12}$ | $X^0Y^{14}$ | $X^{16}Y^0$ | $X^{14}Y^2$ | $X^{12}Y^4$ | $X^{10}Y^6$ | $X^8Y^8$ | $X^6Y^{10}$ |
|---|---|---|---|---|---|---|---|---|
| R1 | −2.2094E−03 | −3.1550E−04 | 3.4035E−05 | 2.7224E−04 | 9.5269E−04 | 1.9058E−03 | 2.3820E−03 | 1.9055E−03 |
| R2 | −4.6124E−02 | −7.1024E−03 | 0.0000E+00 | 0.0000E+00 | 0.0000E+00 | 0.0000E+00 | 0.0000E+00 | 0.0000E+00 |

| | $X^4Y^{12}$ | $X^2Y^{14}$ | $X^0Y^{16}$ | $X^{18}Y^0$ | $X^{16}Y^2$ | $X^{14}Y^4$ | $X^{12}Y^6$ | $X^{10}Y^8$ |
|---|---|---|---|---|---|---|---|---|
| R1 | 9.5318E−04 | 2.7315E−04 | 3.4021E−05 | −2.1324E−06 | −1.9210E−05 | −7.6873E−05 | −1.7930E−04 | −2.6882E−04 |
| R2 | 0.0000E+00 | 0.0000E+00 | 0.0000E+00 | 0.0000E+00 | 0.0000E+00 | 0.0000E+00 | 0.0000E+00 | 0.0000E+00 |

| | $X^8Y^{10}$ | $X^6Y^{12}$ | $X^4Y^{14}$ | $X^2Y^{16}$ | $X^0Y^{18}$ | $X^{20}Y^0$ | $X^{18}Y^2$ | $X^{16}Y^4$ |
|---|---|---|---|---|---|---|---|---|
| R1 | −2.6906E−04 | −1.7918E−04 | −7.6628E−05 | −1.9044E−05 | −2.1361E−06 | 5.8897E−08 | 5.9074E−07 | 2.6605E−06 |
| R2 | 0.0000E+00 | 0.0000E+00 | 0.0000E+00 | 0.0000E+00 | 0.0000E+00 | 0.0000E+00 | 0.0000E+00 | 0.0000E+00 |

| | $X^{14}Y^6$ | $X^{12}Y^8$ | $X^{10}Y^{10}$ | $X^8Y^{12}$ | $X^6Y^{14}$ | $X^4Y^{16}$ | $X^2Y^{18}$ | $X^0Y^{20}$ |
|---|---|---|---|---|---|---|---|---|
| R1 | 7.1167E−06 | 1.2381E−05 | 1.4832E−05 | 1.2562E−05 | 6.9774E−06 | 2.6064E−06 | 5.3840E−07 | 6.1816E−08 |
| R2 | 0.0000E+00 | 0.0000E+00 | 0.0000E+00 | 0.0000E+00 | 0.0000E+00 | 0.0000E+00 | 0.0000E+00 | 0.0000E+00 |

$$z = \frac{cr^2}{1+\sqrt{1-(1+k)c^2r^2}} + \sum_{i=1}^{N} B_i E_i(x, y), \quad (2)$$

where k represents a conic coefficient, Bi represents a free-form surface coefficient, c represents the curvature at the center of the optical surface, r represents a vertical distance between the a point on the free-form surface and the optic axis, x represents the x-direction component of r, y represents the y-direction component of r, z represents aspherical depth (a vertical distance between a point on an aspherical surface, having a distance of x from the optic axis, and a surface tangent to a vertex of the aspherical surface on the optic axis).

For convenience, each free-form surface adopts the surface type defined by the extended polynomial shown in the above equation (1). However, the present disclosure is not limited to the aspherical polynomial form shown in the condition (1).

Figure 2:
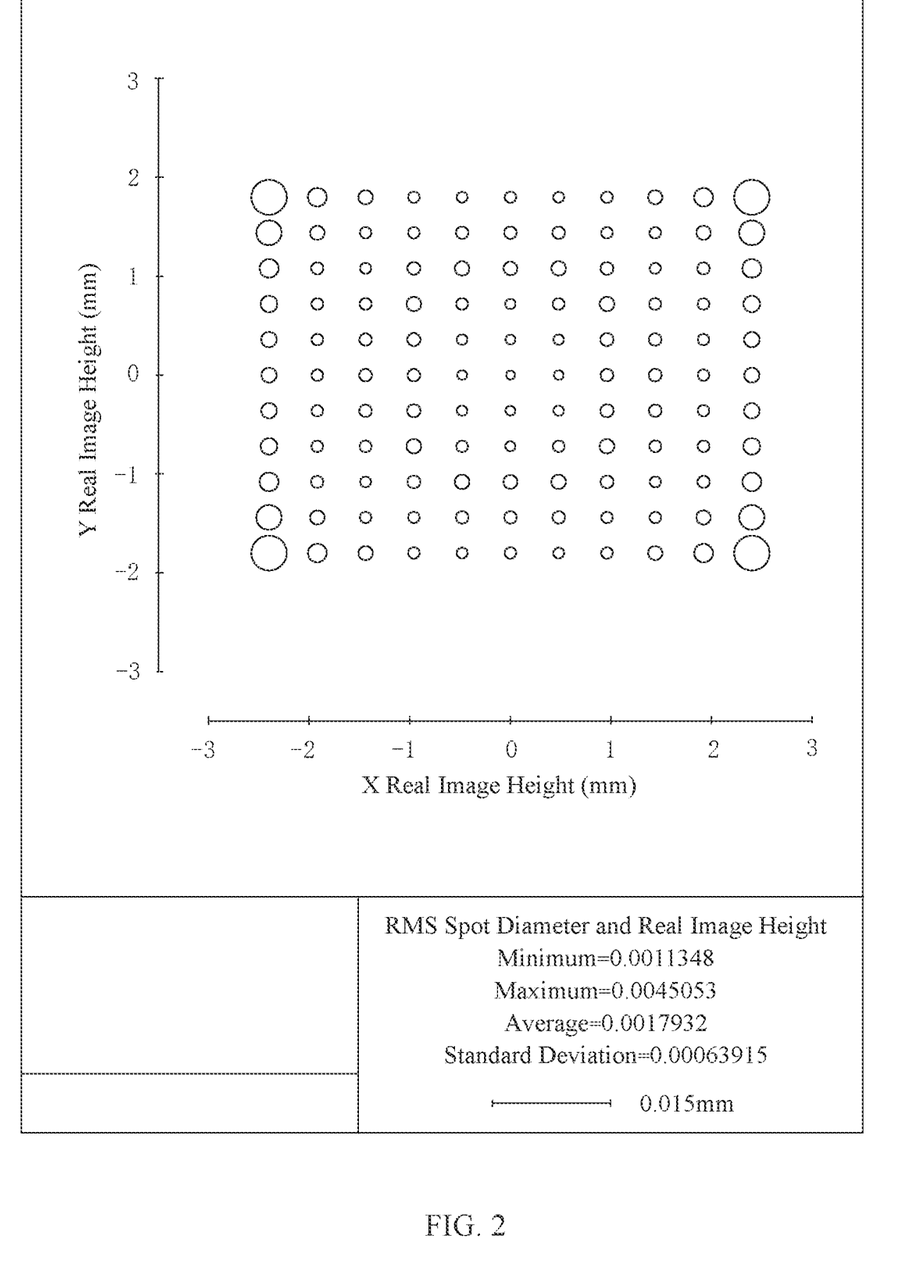
FIG. 2 illustrates a situation where RMS spot diameter of the camera optical lens shown in FIG. 1 is located in a first quadrant.

FIG. 2 shows a situation where the RMS spot diameter of the camera optical lens 10 is within a first quadrant. According to FIG. 2, it can be seen that the camera optical lens 10 according to the Embodiment 1 can achieve good imaging quality.

The following Table 10 lists the respective numerical value corresponding to each condition in this embodiment according to the above-mentioned condition. Obviously, the imaging optical system according to this embodiment satisfies the above-mentioned condition.

In this embodiment, an entrance pupil diameter ENPD of the camera optical lens 10 is 1.000 mm, the full FOV image height IH (in a diagonal direction) is 6.000 mm, the image height in an x direction is 4.800 mm, the image height in a y direction is 3.600 mm, and the imaging effect is the best in this rectangular area; the FOV in a diagonal direction is 120.00°, the FOV in the x direction is 107.35°, and the FOV in the y direction is 91.08°. The camera optical lens 10 satisfies the design requirements of a wide angle and ultra-thinness, and its on-axis and off-axis color aberration is sufficiently corrected, and the camera optical lens 10 has excellent optical characteristics.

Embodiment 2

The Embodiment 2 is basically the same as the Embodiment 1, and the reference signs in the Embodiment 2 are the same as those in the Embodiment 1, and only a difference thereof will be described in the following.

Figure 3:
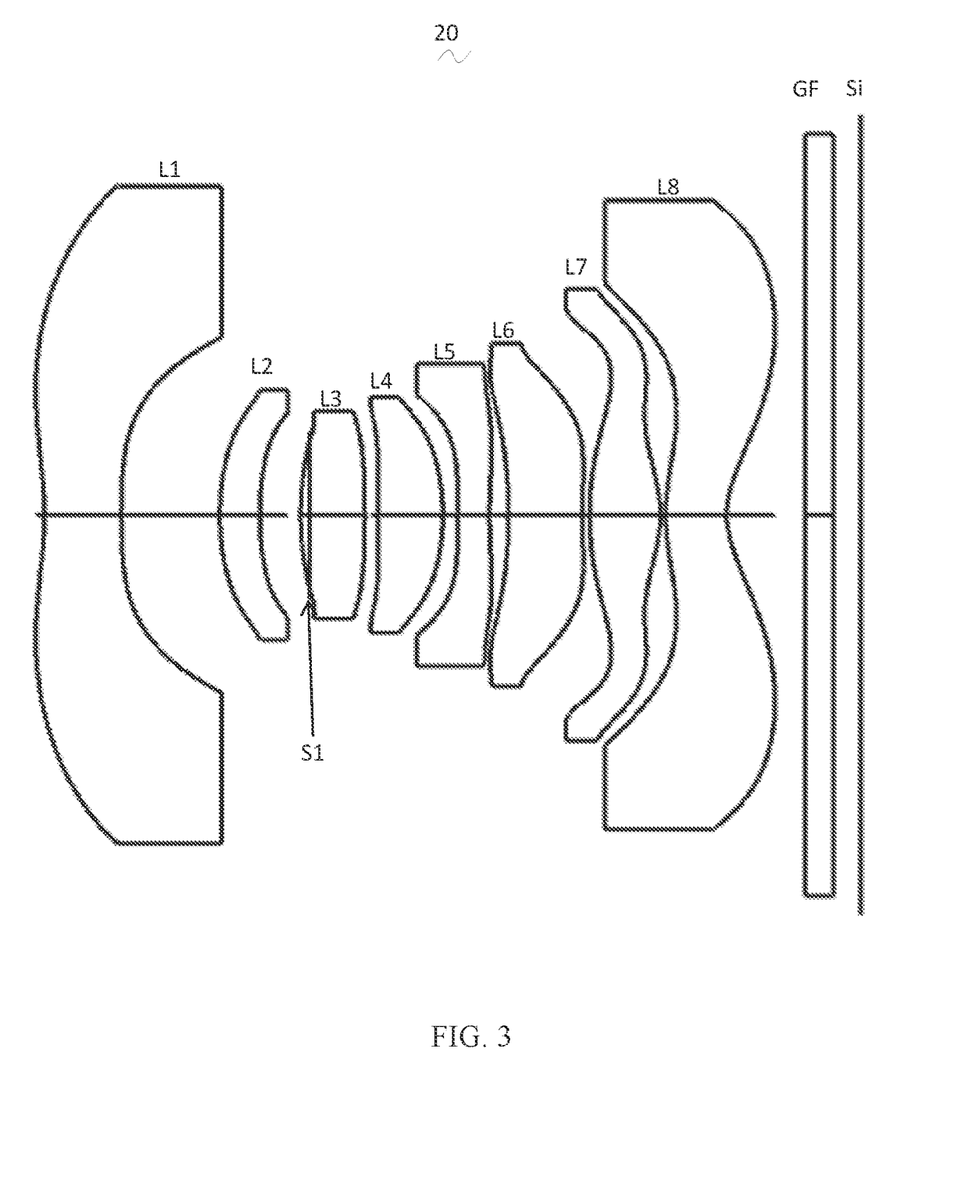
FIG. 3 is a schematic structural diagram of a camera optical lens according to Embodiment 2 of the present disclosure.

As shown in FIG. 3, in the camera optical lens 20 provided in the Embodiment 2, the third lens L3 includes an image-side surface being convex in the paraxial region.

Table 4 and Table 5 show design data of the camera optical lens 20 according to the Embodiment 2 of the present disclosure. Herein, the object-side surface and the image-side surface of the seventh lens L7 are free-form surfaces.

TABLE 4

| | R | d | | nd | | vd |
|---|---|---|---|---|---|---|
| S1 | ∞ | d0= | −2.014 | | | |
| R1 | −2.700 | d1= | 0.585 | nd1 | 1.5444 | v1 | 56.43 |
| R2 | 8.471 | d2= | 0.748 | | | |
| R3 | 2.138 | d3= | 0.305 | nd2 | 1.6610 | v2 | 20.53 |
| R4 | 2.836 | d4= | 0.309 | | | |
| R5 | 2.672 | d5= | 0.487 | nd3 | 1.5444 | v3 | 56.43 |
| R6 | −14.862 | d6= | 0.102 | | | |
| R7 | 18.566 | d7= | 0.491 | nd4 | 1.5444 | v4 | 56.43 |
| R8 | −1.844 | d8= | 0.115 | | | |
| R9 | −13.906 | d9= | 0.240 | nd5 | 1.6800 | v5 | 18.40 |
| R10 | 4.656 | d10= | 0.143 | | | |
| R11 | −4.300 | d11= | 0.563 | nd6 | 1.5444 | v6 | 56.43 |
| R12 | 7.367 | d12= | 0.054 | | | |
| R13 | 3.214 | d13= | 0.538 | nd7 | 1.5444 | v7 | 56.43 |
| R14 | −1.024 | d14= | 0.040 | | | |
| R15 | 1.759 | d15= | 0.463 | nd8 | 1.6032 | v8 | 28.29 |
| R16 | 0.685 | d16= | 0.600 | | | |
| R17 | ∞ | d17= | 0.210 | ndg | 1.5168 | vg | 64.17 |
| R18 | ∞ | d18= | 0.208 | | | |

Table 5 shows aspherical data of each lens in the camera optical lens 20 according to the Embodiment 2 of the present disclosure.

TABLE 5

| | Conic coefficient | Aspherical coefficient | | | | |
|---|---|---|---|---|---|---|
| | k | A4 | A6 | A8 | A10 | A12 |
| R1 | −2.4734E+01 | 8.9026E−02 | −4.8625E−02 | 2.2708E−02 | −7.9577E−03 | 1.9924E−03 |
| R2 | 9.9956E+00 | 2.7578E−01 | −2.2361E−01 | 2.2854E−01 | −1.5938E−01 | 7.2056E−02 |
| R3 | −1.2335E+00 | 1.0303E−03 | −9.2915E−02 | 5.7472E−01 | −1.4772E+00 | 2.2143E+00 |
| R4 | 6.7897E+00 | 1.1020E−01 | 1.8195E−02 | 2.9215E−01 | −6.9639E−01 | 1.4058E+00 |
| R5 | −2.4474E+00 | 3.9676E−02 | 5.4007E−02 | −1.8845E−01 | 3.8548E−01 | −3.5167E−01 |
| R6 | 1.0000E+01 | −1.5189E−01 | −1.6501E−01 | 6.2341E−01 | −1.4053E+00 | 2.1944E+00 |
| R7 | −9.9724E+00 | −1.2705E−01 | −1.3554E−01 | −1.4822E−01 | 1.1025E+00 | −2.0412E+00 |
| R8 | 9.6902E−01 | −1.6541E−02 | −4.7146E−01 | 1.4817E+00 | −3.3988E+00 | 5.2011E+00 |
| R9 | −7.2395E+00 | −2.5928E−01 | −5.5328E−01 | 1.5692E+00 | −3.1369E+00 | 4.7139E+00 |
| R10 | −9.8492E+00 | −1.3586E−01 | −2.9636E−01 | 9.8590E−01 | −1.8297E+00 | 2.2570E+00 |
| R11 | −3.4621E+00 | −5.9095E−02 | 2.1644E−03 | 4.2513E−01 | −1.4596E+00 | 2.2579E+00 |
| R12 | −4.8778E+00 | −1.7647E−02 | −1.4700E+00 | 2.8951E+00 | −2.8234E+00 | 1.3190E+00 |
| R15 | −1.3711E+00 | −2.0935E−01 | −3.0772E−01 | 7.2712E−01 | −6.9469E−01 | 3.7421E−01 |
| R16 | −3.6491E+00 | −1.8343E−01 | 1.2479E−01 | −5.7799E−02 | 1.5803E−02 | −1.9963E−03 |

| | Conic coefficient | Aspherical coefficient | | | |
|---|---|---|---|---|---|
| | k | A14 | A16 | A18 | A20 |
| R1 | −2.4734E+01 | −3.4150E−04 | 3.7839E−05 | −2.4327E−06 | 6.8907E−08 |
| R2 | 9.9956E+00 | −1.6725E−02 | 1.1946E−03 | 0.0000E+00 | 0.0000E+00 |
| R3 | −1.2335E+00 | −1.7276E+00 | 4.8435E−01 | 0.0000E+00 | 0.0000E+00 |
| R4 | 6.7897E+00 | −1.2944E+00 | 0.0000E+00 | 0.0000E+00 | 0.0000E+00 |
| R5 | −2.4474E+00 | 0.0000E+00 | 0.0000E+00 | 0.0000E+00 | 0.0000E+00 |
| R6 | 1.0000E+01 | −1.3535E+00 | 0.0000E+00 | 0.0000E+00 | 0.0000E+00 |
| R7 | −9.9724E+00 | 2.2345E+00 | −9.6094E−01 | 0.0000E+00 | 0.0000E+00 |
| R8 | 9.6902E−01 | −4.5595E+00 | 1.7649E+00 | 0.0000E+00 | 0.0000E+00 |
| R9 | −7.2395E+00 | −4.2274E+00 | 1.5677E+00 | 0.0000E+00 | 0.0000E+00 |
| R10 | −9.8492E+00 | −1.6204E+00 | 6.0476E−01 | −9.0949E−02 | 0.0000E+00 |
| R11 | −3.4621E+00 | −1.7562E+00 | 6.7881E−01 | −1.0462E−01 | 0.0000E+00 |
| R12 | −4.8778E+00 | 8.4160E−02 | −4.3532E−01 | 2.0319E−01 | −3.1763E−02 |
| R15 | −1.3711E+00 | −1.2238E−01 | 2.4470E−02 | −2.8155E−03 | 1.4686E−04 |
| R16 | −3.6491E+00 | −9.0176E−05 | 6.4427E−05 | −7.9497E−06 | 3.4121E−07 |

Table 6 shows the free-form surface data in the camera optical lens 20 according to the Embodiment 2 of the present disclosure.

TABLE 6

| | Free-form surface coefficient | | | | | | | |
|---|---|---|---|---|---|---|---|---|
| | k | $X^4Y^0$ | $X^2Y^2$ | $X^0Y^4$ | $X^6Y^0$ | $X^4Y^2$ | $X^2Y^4$ | $X^0Y^6$ |
| R13 | 2.3050E+00 | 3.8001E−01 | 7.5878E−01 | 3.8024E−01 | −1.3431E+00 | −4.0281E+00 | −4.0291E+00 | −1.3440E+00 |
| R14 | −6.8969E−01 | 7.5051E−01 | 1.4996E+00 | 7.5053E−01 | −6.3964E−01 | −1.9176E+00 | −1.9183E+00 | −6.3996E−01 |

| | $X^8Y^0$ | $X^6Y^2$ | $X^4Y^4$ | $X^2Y^6$ | $X^0Y^8$ | $X^{10}Y^0$ | $X^8Y^2$ | $X^6Y^4$ |
|---|---|---|---|---|---|---|---|---|
| R13 | 2.3479E+00 | 9.3915E+00 | 1.4089E+01 | 9.3922E+00 | 2.3485E+00 | −2.5305E+00 | −1.2652E+01 | −2.5308E+01 |
| R14 | 8.8449E−01 | 3.5380E+00 | 5.3067E+00 | 3.5385E+00 | 8.8451E−01 | −1.2070E+00 | −6.0346E+00 | −1.2070E+01 |

| | $X^4Y^6$ | $X^2Y^8$ | $X^0Y^{10}$ | $X^{12}Y^0$ | $X^{10}Y^2$ | $X^8Y^4$ | $X^6Y^6$ | $X^4Y^8$ |
|---|---|---|---|---|---|---|---|---|
| R13 | −2.5304E+01 | −1.2652E+01 | −2.5304E+00 | 1.6416E+00 | 9.8498E+00 | 2.4625E+01 | 3.2832E+01 | 2.4625E+01 |
| R14 | −1.2069E+01 | −6.0345E+00 | −1.2068E+00 | 1.0106E+00 | 6.0639E+00 | 1.5159E+01 | 2.0213E+01 | 1.5160E+01 |

| | $X^2Y^{10}$ | $X^0Y^{12}$ | $X^{14}Y^0$ | $X^{12}Y^2$ | $X^{10}Y^4$ | $X^8Y^6$ | $X^6Y^8$ | $X^4Y^{10}$ |
|---|---|---|---|---|---|---|---|---|
| R13 | 9.8500E+00 | 1.6416E+00 | −6.2079E−01 | −4.3457E+00 | −1.3037E+01 | −2.1727E+01 | −2.1728E+01 | −1.3037E+01 |
| R14 | 6.0639E+00 | 1.0107E+00 | −5.0498E−01 | −3.5349E+00 | −1.0605E+01 | −1.7674E+01 | −1.7674E+01 | −1.0605E+01 |

| | $X^2Y^{12}$ | $X^0Y^{14}$ | $X^{16}Y^0$ | $X^{14}Y^2$ | $X^{12}Y^4$ | $X^{10}Y^6$ | $X^8Y^8$ | $X^6Y^{10}$ |
|---|---|---|---|---|---|---|---|---|
| R13 | −4.3457E+00 | −6.2082E−01 | 1.2099E−01 | 9.6795E−01 | 3.3878E+00 | 6.7756E+00 | 8.4706E+00 | 6.7754E+00 |
| R14 | −3.5350E+00 | −5.0499E−01 | 1.4932E−01 | 1.1946E+00 | 4.1811E+00 | 8.3623E+00 | 1.0453E+01 | 8.3622E+00 |

TABLE 6-continued

| | $X^4Y^{12}$ | $X^2Y^{14}$ | $X^0Y^{16}$ | $X^{18}Y^0$ | $X^{16}Y^2$ | $X^{14}Y^4$ | $X^{12}Y^6$ | $X^{10}Y^8$ |
|---|---|---|---|---|---|---|---|---|
| R13 | 3.3872E+00 | 9.6769E−01 | 1.2102E−01 | −7.3553E−03 | −6.6169E−02 | −2.6475E−01 | −6.1791E−01 | −9.2642E−01 |
| R14 | 4.1808E+00 | 1.1945E+00 | 1.4932E−01 | −2.4192E−02 | −2.1774E−01 | −8.7092E−01 | −2.0321E+00 | −3.0482E+00 |

| | $X^8Y^{10}$ | $X^6Y^{12}$ | $X^4Y^{14}$ | $X^2Y^{16}$ | $X^0Y^{18}$ | $X^{20}Y^0$ | $X^{18}Y^2$ | $X^{16}Y^4$ |
|---|---|---|---|---|---|---|---|---|
| R13 | −9.2631E−01 | −6.1771E−01 | −2.6515E−01 | −6.6285E−02 | −7.3402E−03 | −5.3883E−04 | −5.3939E−03 | −2.4324E−02 |
| R14 | −3.0483E+00 | −2.0322E+00 | −8.7103E−01 | −2.1773E−01 | −2.4202E−02 | 1.6596E−03 | 1.6602E−02 | 7.4693E−02 |

| | $X^{14}Y^6$ | $X^{12}Y^8$ | $X^{10}Y^{10}$ | $X^8Y^{12}$ | $X^6Y^{14}$ | $X^4Y^{16}$ | $X^2Y^{18}$ | $X^0Y^{20}$ |
|---|---|---|---|---|---|---|---|---|
| R13 | −6.4448E−02 | −1.1382E−01 | −1.3602E−01 | −1.1345E−01 | −6.4386E−02 | −2.3854E−02 | −5.2374E−03 | −5.5415E−04 |
| R14 | 1.9912E−01 | 3.4854E−01 | 4.1822E−01 | 3.4854E−01 | 1.9928E−01 | 7.4789E−02 | 1.6626E−02 | 1.6631E−03 |

Figure 4:
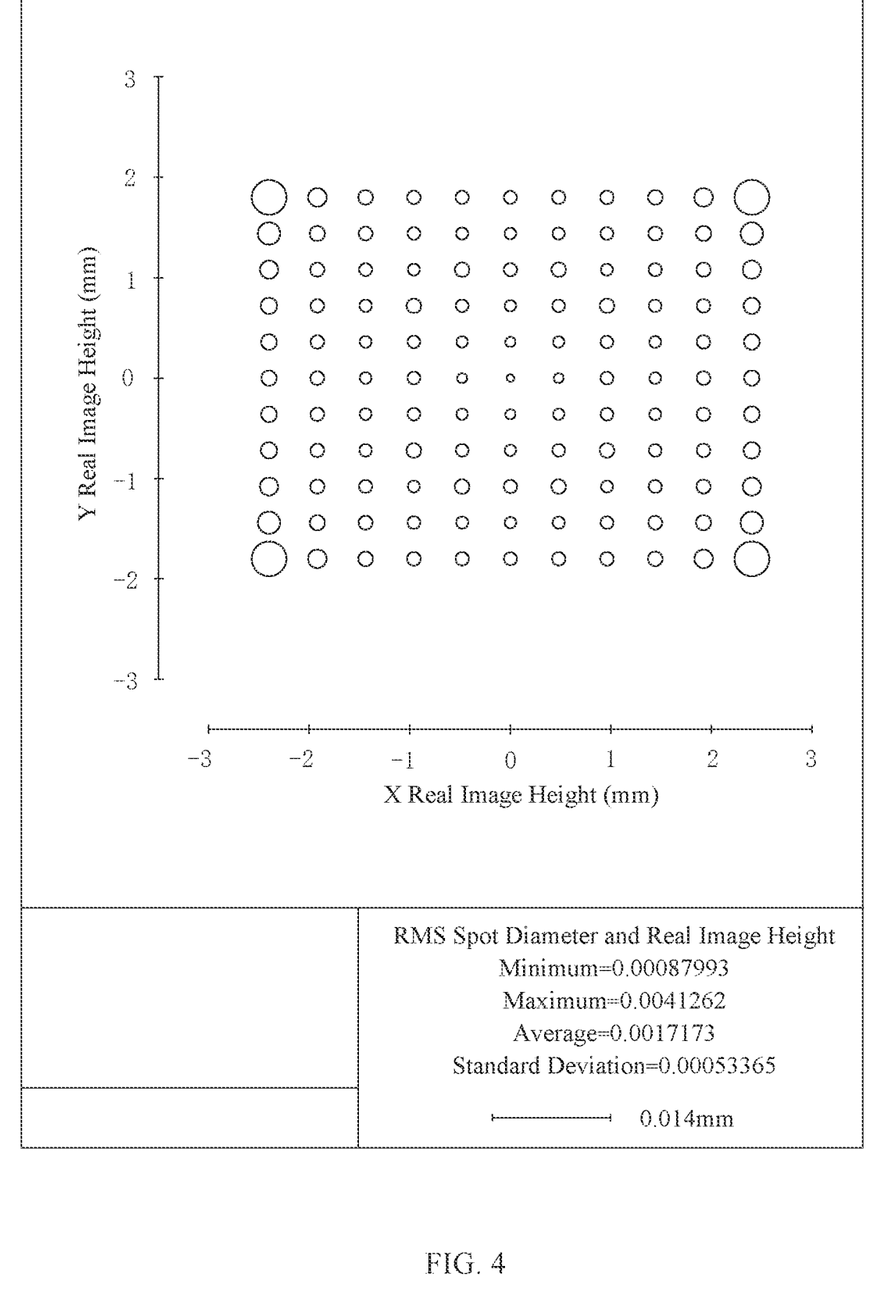
FIG. 4 illustrates a situation where RMS spot diameter of the camera optical lens shown in FIG. 3 is located in a first quadrant.

FIG. 4 shows a situation where the RMS spot diameter of the camera optical lens 20 according to the Embodiment 2 is within a first quadrant. According to FIG. 4, it can be seen that the camera optical lens 20 according to the Embodiment 2 can achieve good imaging quality.

The following Table 10 lists the respective numerical value corresponding to each condition in this embodiment according to the above-mentioned condition. Obviously, the imaging optical system according to this embodiment satisfies the above-mentioned condition.

In this embodiment, an entrance pupil diameter ENPD of the camera optical lens is 1.000 mm, the full FOV image height IH (in a diagonal direction) is 6.000 mm, the image height in an x direction is 4.800 mm, the image height in a y direction is 3.600 mm, and the imaging effect is the best in this rectangular area; the FOV in a diagonal direction is 120.00°, the FOV in the x direction is 106.96°, and the FOV in the y direction is 90.38°. The camera optical lens 20 satisfies the design requirements of a wide angle and ultra-thinness, and its on-axis and off-axis color aberration is sufficiently corrected, and the camera optical lens 10 has excellent optical characteristics.

Embodiment 3

The Embodiment 3 is basically the same as the Embodiment 1, and the reference signs in the Embodiment 3 are the same as those in the Embodiment 1, and only a difference thereof will be described in the following.

Figure 5:
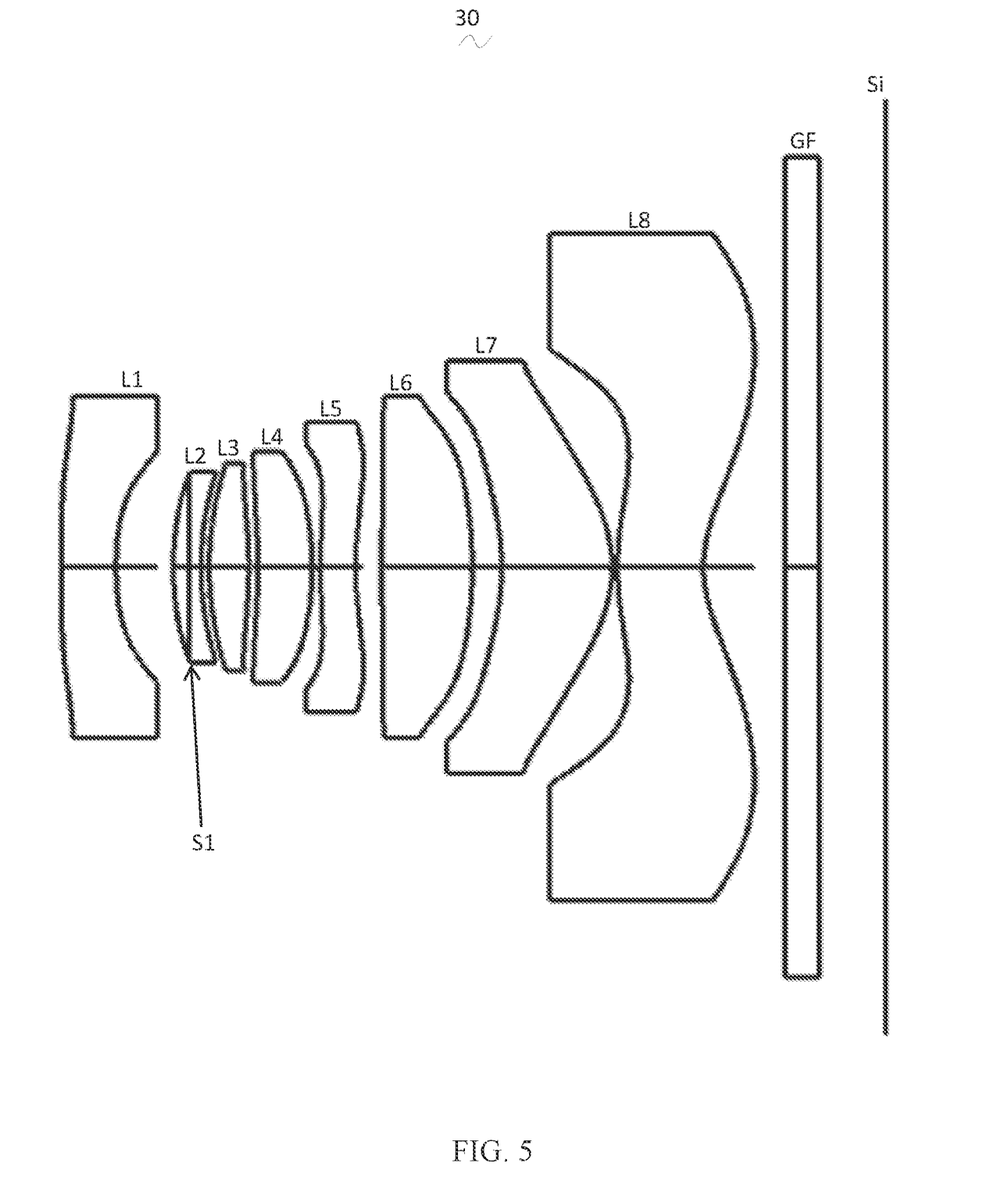
FIG. 5 is a schematic structural diagram of a camera optical lens according to Embodiment 3 of the present disclosure.

As shown in FIG. 5, in the camera optical lens 30 provided in the Embodiment 3, the second lens L2 has a negative refractive power, the sixth lens L6 has a positive refractive power, the third lens L3 includes an image-side surface being convex in a paraxial region, the fourth lens L4 includes an object-side surface being concave in a paraxial region, the fifth lens L5 includes an object-side surface being convex in a paraxial region, the sixth lens L6 includes an object-side surface being convex in a paraxial region and an image-side surface being convex in a paraxial region, the seventh lens L7 includes an object-side surface being concave in a paraxial region, and the aperture S1 is located between the first lens L1 and the second lens L2.

Table 7 and Table 8 show design data of the camera optical lens 30 according to the Embodiment 3 of the present disclosure. Herein, the object-side surface and the image-side surface of the eighth lens L8 are free-form surfaces.

TABLE 7

| | R | d | | nd | | vd |
|---|---|---|---|---|---|---|
| S1 | ∞ | d0= | −0.789 | | | |
| R1 | −11.569 | d1= | 0.336 | nd1 | 1.5444 v1 | 55.82 |
| R2 | 2.202 | d2= | 0.357 | | | |
| R3 | 2.388 | d3= | 0.172 | nd2 | 1.5444 v2 | 55.82 |
| R4 | 2.012 | d4= | 0.049 | | | |
| R5 | 2.078 | d5= | 0.247 | nd3 | 1.5444 v3 | 55.82 |
| R6 | −2.781 | d6= | 0.058 | | | |
| R7 | −3.393 | d7= | 0.337 | nd4 | 1.5444 v4 | 55.82 |
| R8 | −2.166 | d8= | 0.051 | | | |
| R9 | 3.360 | d9= | 0.219 | nd5 | 1.6613 v5 | 20.37 |
| R10 | 2.038 | d10= | 0.163 | | | |
| R11 | 7.279 | d11= | 0.563 | nd6 | 1.5444 v6 | 55.82 |
| R12 | −3.126 | d12= | 0.184 | | | |
| R13 | −1.512 | d13= | 0.688 | nd7 | 1.5444 v7 | 55.82 |
| R14 | −0.872 | d14= | 0.032 | | | |
| R15 | 1.711 | d15= | 0.535 | nd8 | 1.6449 v8 | 22.54 |
| R16 | 0.778 | d16= | 0.511 | | | |
| R17 | ∞ | d17= | 0.210 | ndg | 1.5168 vg | 64.17 |
| R18 | ∞ | d18= | 0.413 | | | |

Table 8 shows aspherical data of each lens in the camera optical lens 30 according to the Embodiment 3 of the present disclosure.

TABLE 8

| | Conic coefficient | Aspherical coefficient | | | | |
|---|---|---|---|---|---|---|
| | k | A4 | A6 | A8 | A10 | A12 |
| R1 | −7.3286E+02 | 2.9608E−01 | −3.8540E−01 | 3.1752E−01 | −2.1398E−01 | 8.6678E−02 |
| R2 | −2.5027E+00 | 6.5438E−01 | −3.5916E−01 | −2.3828E+00 | 2.0377E+01 | −7.3391E+01 |
| R3 | 4.8550E+00 | 2.2074E−01 | −9.3318E−01 | 4.7442E+00 | −1.5832E+01 | 3.4127E+01 |
| R4 | −7.6081E−01 | −1.5987E−02 | −1.9839E−02 | 1.2869E−02 | 9.8764E−02 | 2.1251E−01 |
| R5 | −9.8824E−01 | −1.2703E−02 | −9.6199E−03 | −6.6704E−04 | 2.1811E−02 | 2.3839E−02 |
| R6 | −3.6273E+01 | 6.5979E−02 | 3.0367E−01 | −2.9369E−01 | −3.5446E−01 | 7.0141E−01 |
| R7 | −4.2800E+01 | 1.8771E−01 | −5.9782E−02 | −3.8802E−01 | 1.4601E−01 | 4.5605E−01 |
| R8 | 2.7763E−01 | −1.4159E−01 | 6.1147E−01 | −3.0704E+00 | 6.0795E+00 | −6.5594E+00 |
| R9 | −1.7378E+01 | −5.3530E−01 | 1.3944E+00 | −4.7804E+00 | 8.9356E+00 | −1.1767E+01 |

TABLE 8-continued

| | | | | | |
|---|---|---|---|---|---|
| R10 | −5.5403E−01 | −5.0363E−01 | 1.0614E+00 | −2.4565E+00 | 3.3552E+00 | −2.8413E+00 |
| R11 | −3.5041E+01 | −1.8579E−01 | 4.1702E−01 | −8.0346E−01 | 1.1304E+00 | −1.0590E+00 |
| R12 | 3.4763E+00 | 5.1619E−02 | −6.9067E−01 | 2.8485E+00 | −7.2053E+00 | 1.0479E+01 |
| R13 | 3.7797E−02 | 3.9446E−01 | −7.0034E−01 | 1.7661E+00 | −3.2600E+00 | 3.2905E+00 |
| R14 | −2.4149E+00 | 2.6222E−02 | 6.6094E−02 | −3.1236E−01 | 8.0828E−01 | −1.0418E+00 |

| | Conic coefficient | Aspherical coefficient | | | |
|---|---|---|---|---|---|
| | k | A14 | A16 | A18 | A20 |
| R1 | −7.3286E+02 | −2.0491E−02 | 9.7649E−03 | −4.6623E−03 | 7.0786E−04 |
| R2 | −2.5027E+00 | 1.3124E+02 | −1.0145E+02 | −5.7197E+00 | 3.7326E+01 |
| R3 | 4.8550E+00 | −3.4636E+01 | −1.4711E+00 | −1.0960E+01 | 5.8108E+01 |
| R4 | −7.6081E−01 | 3.1556E−01 | 1.7458E−02 | −1.1150E+00 | −4.5416E+00 |
| R5 | −9.8824E−01 | 3.9097E−02 | 1.1142E−01 | −2.5643E−01 | −2.9474E+00 |
| R6 | −3.6273E+01 | 2.1127E+00 | −3.3582E+00 | 2.6013E+00 | −1.2215E+01 |
| R7 | −4.2800E+01 | −2.9409E−01 | −1.5978E+00 | 3.2341E+00 | −4.9082E+00 |
| R8 | 2.7763E−01 | 2.1563E+00 | 5.1122E−01 | −4.6117E−01 | 3.3187E+00 |
| R9 | −1.7378E+01 | 8.5172E+00 | −2.0014E+00 | 5.8446E−01 | 6.1092E−01 |
| R10 | −5.5403E−01 | 1.3520E+00 | −2.3823E−01 | 1.4300E−02 | 3.9385E−03 |
| R11 | −3.5041E+01 | 5.7490E−01 | −1.2190E−01 | 1.2495E−03 | −3.7232E−03 |
| R12 | 3.4763E+00 | −9.1543E+00 | 4.8538E+00 | −1.4528E+00 | 1.9139E−01 |
| R13 | 3.7797E−02 | −1.7963E+00 | 4.9248E−01 | −4.8663E−02 | −2.2020E−04 |
| R14 | −2.4149E+00 | 6.8408E−01 | −2.2085E−01 | 2.7554E−02 | 2.0745E−04 |

Table 9 shows free-form surface data in the camera optical lens 30 according to the Embodiment 3 of the present disclosure.

TABLE 9

| Free-form surface coefficient | | | | | | | | |
|---|---|---|---|---|---|---|---|---|
| | k | $X^4Y^0$ | $X^2Y^2$ | $X^0Y^4$ | $X^6Y^0$ | $X^4Y^2$ | $X^2Y^4$ | $X^0Y^6$ |
| R15 | −1.2317E+01 | −6.7123E−02 | −1.3454E−01 | −6.7501E−02 | −3.7471E−01 | −1.1234E+00 | −1.1225E+00 | −3.7460E−01 |
| R16 | −4.3143E+00 | −1.4933E−01 | −2.9787E−01 | −1.4941E−01 | 9.4947E−02 | 2.8464E−01 | 2.8489E−01 | 9.4909E−02 |
| | $X^8Y^0$ | $X^6Y^2$ | $X^4Y^4$ | $X^2Y^6$ | $X^0Y^8$ | $X^{10}Y^0$ | $X^8Y^2$ | $X^6Y^4$ |
| R15 | 8.2498E−01 | 3.2997E+00 | 4.9521E+00 | 3.3001E+00 | 8.2498E−01 | −1.2624E+00 | −6.3122E+00 | −1.2623E+01 |
| R16 | −5.0604E−02 | −2.0242E−01 | −3.0362E−01 | −2.0232E−01 | −5.0616E−02 | 2.0658E−02 | 1.0330E−01 | 2.0658E−01 |
| | $X^4Y^6$ | $X^2Y^8$ | $X^0Y^{10}$ | $X^{12}Y^0$ | $X^{10}Y^2$ | $X^8Y^4$ | $X^6Y^6$ | $X^4Y^8$ |
| R15 | −1.2623E+01 | −6.3121E+00 | −1.2624E+00 | 1.3275E+00 | 7.9646E+00 | 1.9912E+01 | 2.6549E+01 | 1.9912E+01 |
| R16 | 2.0662E−01 | 1.0332E−01 | 2.0657E−02 | −6.4760E−03 | −3.8853E−02 | −9.7137E−02 | −1.2951E−01 | −9.7123E−02 |
| | $X^2Y^{10}$ | $X^0Y^{12}$ | $X^{14}Y^0$ | $X^{12}Y^2$ | $X^{10}Y^4$ | $X^8Y^6$ | $X^6Y^8$ | $X^4Y^{10}$ |
| R15 | 7.9645E+00 | 1.3274E+00 | −9.2920E−01 | −6.5044E+00 | −1.9513E+01 | −3.2522E+01 | −3.2522E+01 | −1.9513E+01 |
| R16 | −3.8851E−02 | −6.4764E−03 | 1.4677E−03 | 1.0275E−02 | 3.0823E−02 | 5.1374E−02 | 5.1374E−02 | 3.0825E−02 |
| | $X^2Y^{12}$ | $X^0Y^{14}$ | $X^{16}Y^0$ | $X^{14}Y^2$ | $X^{12}Y^4$ | $X^{10}Y^6$ | $X^8Y^8$ | $X^6Y^{10}$ |
| R15 | −6.5044E+00 | −9.2925E−01 | 3.9896E−01 | 3.1918E+00 | 1.1171E+01 | 2.2342E+01 | 2.7927E+01 | 2.2342E+01 |
| R16 | 1.0274E−02 | 1.4675E−03 | −2.1962E−04 | −1.7569E−03 | −6.1493E−03 | −1.2299E−02 | −1.5373E−02 | −1.2298E−02 |
| | $X^4Y^{12}$ | $X^2Y^{14}$ | $X^0Y^{16}$ | $X^{18}Y^0$ | $X^{16}Y^2$ | $X^{14}Y^4$ | $X^{12}Y^6$ | $X^{10}Y^8$ |
| R15 | 1.1171E+01 | 3.1918E+00 | 3.9892E−01 | −9.2787E−02 | −8.3505E−01 | −3.3403E+00 | −7.7940E+00 | −1.1692E+01 |
| R16 | −6.1492E−03 | −1.7574E−03 | −2.1960E−04 | 1.9074E−05 | 1.7168E−04 | 6.8667E−04 | 1.6022E−03 | 2.4029E−03 |
| | $X^8Y^{10}$ | $X^6Y^{12}$ | $X^4Y^{14}$ | $X^2Y^{16}$ | $X^0Y^{18}$ | $X^{20}Y^0$ | $X^{18}Y^2$ | $X^{16}Y^4$ |
| R15 | −1.1691E+01 | −7.7939E+00 | −3.3402E+00 | −8.3495E−01 | −9.2795E−02 | 8.8826E−03 | 8.8856E−02 | 3.9980E−01 |
| R16 | 2.4031E−03 | 1.6020E−03 | 6.8636E−04 | 1.7114E−04 | 1.9090E−05 | −7.1641E−07 | −7.1810E−06 | −3.2294E−05 |
| | $X^{14}Y^6$ | $X^{12}Y^8$ | $X^{10}Y^{10}$ | $X^8Y^{12}$ | $X^6Y^{14}$ | $X^4Y^{16}$ | $X^2Y^{18}$ | $X^0Y^{20}$ |
| R15 | 1.0658E+00 | 1.8651E+00 | 2.2384E+00 | 1.8654E+00 | 1.0661E+00 | 3.9993E−01 | 8.8888E−02 | 8.8962E−03 |
| R16 | −8.6076E−05 | −1.5081E−04 | −1.8119E−04 | −1.5074E−04 | −8.6282E−05 | −3.2470E−05 | −7.4943E−06 | −7.1080E−07 |

Figure 6:
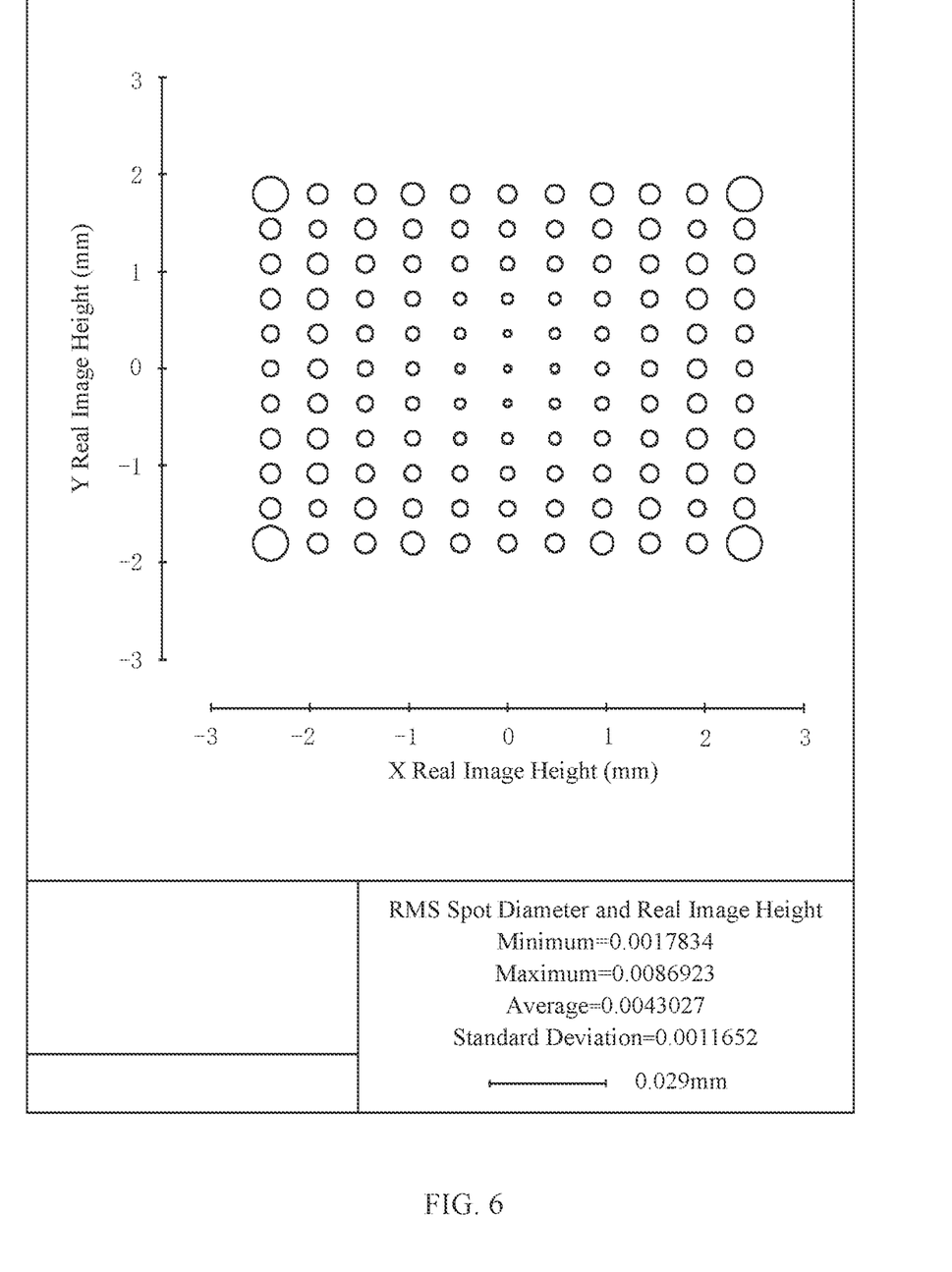
FIG. 6 illustrates a situation where RMS spot diameter of the camera optical lens shown in FIG. 5 is located in a first quadrant.

FIG. 6 shows a situation where the RMS spot diameter of the camera optical lens 30 according to the Embodiment 3 is located in a first quadrant. According to FIG. 6, it can be seen that the camera optical lens 30 according to the Embodiment 3 can achieve good imaging quality.

The following Table 10 lists the respective numerical value corresponding to each condition in this embodiment according to the above-mentioned condition. Obviously, the imaging optical system according to this embodiment satisfies the above-mentioned condition.

In this embodiment, an entrance pupil diameter ENPD of the camera optical lens is 1.030 mm, the full FOV image height IH (in a diagonal direction) is 6.000 mm, the image height in an x direction is 4.800 mm, the image height in a y direction is 3.600 mm, and the imaging effect is the best in this rectangular area; the FOV in a diagonal direction is 122.32°, the FOV in the x direction is 99.29°, and the FOV in the y direction is 79.25°. The camera optical lens 30 satisfies the design requirements of a wide angle and ultra-thinness, and its on-axis and off-axis color aberration is sufficiently corrected, and the camera optical lens 10 has excellent optical characteristics.

TABLE 10

| Parameters and relation expression | Embodiment 1 | Embodiment 2 | Embodiment 3 |
|---|---|---|---|
| f4/f | 1.36 | 1.72 | 4.85 |
| (R9 + R10)/(R9 − R10) | 0.05 | 0.50 | 4.08 |
| f | 1.800 | 1.800 | 2.059 |
| f1 | −3.639 | −3.681 | −3.355 |
| f2 | 9.488 | 11.095 | −27.879 |
| f3 | 9.631 | 4.187 | 2.215 |
| f4 | 2.450 | 3.098 | 9.983 |
| f5 | −5.920 | −5.054 | −8.298 |
| f6 | −5.012 | −4.888 | 4.078 |
| f7 | 1.486 | 1.488 | 2.729 |
| f8 | −2.190 | −2.207 | −2.828 |
| FNO | 1.80 | 1.80 | 2.00 |
| FOV | 120.00° | 120.00° | 122.32° |
| TTL | 6.201 | 6.201 | 5.125 |
| IH | 6.000 | 6.000 | 6.000 |

It should be understood by those skilled in the art that the above embodiments are merely some specific embodiments of the present disclosure, and various changes in form and details may be made without departing from the scope of the present disclosure.

What is claimed is:

1. A camera optical lens, comprising a first lens having a negative refractive power, a second lens having a refractive power, a third lens having a positive refractive power, a fourth lens having a positive refractive power, a fifth lens having a negative refractive power, a sixth lens having a refractive power, a seventh lens having a positive refractive power, and an eighth lens having a negative refractive power that are sequentially arranged from an object side to an image side, the camera optical lens consisting of eight lenses, wherein at least one of the first lens, the second lens, the third lens, the fourth lens, the fifth lens, the sixth lens, the seventh lens, or the eighth lens has a free-form surface, and the camera optical lens satisfies:

$1.30 \leq f4/f \leq 5.00$;

$0 \leq (R9+R10)/(R9-R10) \leq 4.50$, $-1.03 \leq (R1+R2)/(R1-R2) \leq 1.02$, and $4.00 \leq d7/d6 \leq 12.00$;

where f denotes a focal length of the camera optical lens, f4 denotes a focal length of the fourth lens, R1 denotes a curvature radius of an object-side surface of the first lens, R2 denotes a curvature radius of an image-side surface of the first lens, R9 denotes a curvature radius of an object-side surface of the fifth lens, R10 denotes a curvature radius of an image-side surface of the fifth lens, d6 denotes an on-axis distance from an image-side surface of the third lens to an object-side surface of the fourth lens, and d7 denotes an on-axis thickness of the fourth lens.

2. The camera optical lens as described in claim 1, further satisfying:

$-4.09 \leq f1/f \leq -1.09$; and $0.03 \leq d1/TTL \leq 0.14$, where f1 denotes a focal length of the first lens, d1 denotes an on-axis thickness of the first lens, and TTL denotes a total optical length from the object-side surface of the first lens to an image plane of the camera optical lens along an optic axis.

3. The camera optical lens as described in claim 1, further satisfying:

$-27.08 \leq f2/f \leq 9.25$;

$-14.25 \leq (R3+R4)/(R3-R4) \leq 17.55$; and $0.02 \leq d3/TTL \leq 0.08$, where f2 denotes a focal length of the second lens, R3 denotes a curvature radius of an object-side surface of the second lens, R4 denotes a curvature radius of an image-side surface of the second lens, d3 denotes an on-axis thickness of the second lens, and TTL denotes a total optical length from an object-side surface of the first lens to an image plane of the camera optical lens along an optic axis.

4. The camera optical lens as described in claim 1, further satisfying:

$0.54 \leq f3/f \leq 8.03$;

$-5.25 \leq (R5+R6)/(R5-R6) \leq -0.10$; and $0.02 \leq d5/TTL \leq 0.12$, where f3 denotes a focal length of the third lens, R5 denotes a curvature radius of an object-side surface of the third lens, R6 denotes a curvature radius of an image-side surface of the third lens, d5 denotes an on-axis thickness of the third lens, and TTL denotes a total optical length from an object-side surface of the first lens to an image plane of the camera optical lens along an optic axis.

5. The camera optical lens as described in claim 1, further satisfying:

$0.20 \leq (R7+R8)/(R7-R8) \leq 6.80$; and $0.03 \leq d7/TTL \leq 0.14$, where R7 denotes a curvature radius of an object-side surface of the fourth lens, R8 denotes a curvature radius of an image-side surface of the fourth lens, d7 denotes an on-axis thickness of the fourth lens, and TTL denotes a total optical length from an object-side surface of the first lens to an image plane of the camera optical lens along an optic axis.

6. The camera optical lens as described in claim 1, further satisfying:

$$-8.06 \leq f5/f \leq -1.87; \text{ and}$$

$$0.02 \leq d9/TTL \leq 0.06,$$

where f5 denotes a focal length of the fifth lens, d9 denotes an on-axis thickness of the fifth lens, and TTL denotes a total optical length from an object-side surface of the first lens to an image plane of the camera optical lens along an optic axis.

7. The camera optical lens as described in claim 1, further satisfying:

$$-5.57 \leq f6/f \leq 2.97;$$

$$-0.54 \leq (R11+R12)/(R11-R12) \leq 0.60; \text{ and}$$

$$0.05 \leq d11/TTL \leq 0.16,$$

where f6 denotes a focal length of the sixth lens, R11 denotes a curvature radius of an object-side surface of the sixth lens, R12 denotes a curvature radius of an image-side surface of the sixth lens, d11 denotes an on-axis thickness of the sixth lens, and TTL denotes a total optical length from an object-side surface of the first lens to an image plane of the camera optical lens along an optic axis.

8. The camera optical lens as described in claim 1, further satisfying:

$$0.41 \leq f7/f \leq 1.99;$$

$$0.26 \leq (R13+R14)/(R13-R14) \leq 5.59; \text{ and}$$

$$0.04 \leq d13/TTL \leq 0.20,$$

where f7 denotes a focal length of the seventh lens, R13 denotes a curvature radius of an object-side surface of the seventh lens, R14 denotes a curvature radius of an image-side surface of the seventh lens, d13 denotes an on-axis thickness of the seventh lens, and TTL denotes a total optical length from an object-side surface of the first lens to an image plane of the camera optical lens along an optic axis.

9. The camera optical lens as described in claim 1, further satisfying:

$$-2.75 \leq f8/f \leq -0.81;$$

$$1.14 \leq (R15+R16)/(R15-R16) \leq 4.00; \text{ and}$$

$$0.04 \leq d15/TTL \leq 0.16,$$

where f8 denotes a focal length of the eighth lens, R15 denotes a curvature radius of an object-side surface of the eighth lens, R16 denotes a curvature radius of an image-side surface of the eighth lens, d15 denotes an on-axis thickness of the eighth lens, and TTL denotes a total optical length from an object-side surface of the first lens to an image plane of the camera optical lens along an optic axis.

* * * * *